(12) United States Patent
Shaw

(10) Patent No.: US 7,997,375 B2
(45) Date of Patent: Aug. 16, 2011

(54) VEHICLE HOOD APPARATUS

(76) Inventor: Tony Shaw, Grand Prairie (CA)

( * ) Notice: Subject to any disclaimer, the term of this patent is extended or adjusted under 35 U.S.C. 154(b) by 124 days.

(21) Appl. No.: 12/425,442

(22) Filed: Apr. 17, 2009

(65) Prior Publication Data

US 2010/0263957 A1    Oct. 21, 2010

(51) Int. Cl.
*B60K 28/14* (2006.01)
*B62D 25/10* (2006.01)
(52) U.S. Cl. .......... 180/274; 180/69.21; 296/187.04
(58) Field of Classification Search .......... 180/274, 180/69.21; 296/187.04
See application file for complete search history.

(56) References Cited

U.S. PATENT DOCUMENTS

| | | | |
|---|---|---|---|
| 4,249,632 A | 2/1981 | Lucchini et al. | |
| 6,182,782 B1 * | 2/2001 | Matsuura et al. | 180/274 |
| 6,293,362 B1 | 9/2001 | Sasaki et al. | |
| 6,332,115 B1 | 12/2001 | Nobusawa et al. | |
| 6,415,883 B1 | 7/2002 | Myrholt et al. | |
| 6,467,563 B1 | 10/2002 | Ryan et al. | |
| 6,499,555 B2 * | 12/2002 | Ishizaki et al. | 180/274 |
| 6,510,914 B2 * | 1/2003 | Ishizaki et al. | 180/274 |
| 6,516,278 B1 | 2/2003 | Ishizaki et al. | |
| 6,571,901 B2 | 6/2003 | Lee | |
| 6,600,412 B2 * | 7/2003 | Ishizaki et al. | 340/436 |
| 6,712,169 B2 | 3/2004 | Ryan et al. | |
| 6,728,613 B2 * | 4/2004 | Ishizaki et al. | 701/36 |
| 6,802,556 B2 * | 10/2004 | Mattsson et al. | 296/187.09 |
| 6,857,495 B2 | 2/2005 | Sawa | |
| 6,920,954 B2 | 7/2005 | Hashimoto et al. | |
| 6,953,220 B2 | 10/2005 | Takehara | |
| 7,303,041 B2 * | 12/2007 | Stuve | 180/274 |
| 7,357,212 B2 | 4/2008 | Sasaki et al. | |
| 7,520,363 B2 * | 4/2009 | Yamaguchi et al. | 180/274 |
| 7,730,990 B2 * | 6/2010 | Boggess et al. | 180/274 |
| 2004/0113459 A1 * | 6/2004 | Mattsson et al. | 296/187.04 |
| 2007/0039772 A1 * | 2/2007 | Stuve | 180/274 |
| 2007/0125589 A1 * | 6/2007 | Murphy | 180/274 |

* cited by examiner

*Primary Examiner* — Paul N Dickson
*Assistant Examiner* — Drew Brown
(74) *Attorney, Agent, or Firm* — Maxey Law Offices, PLLC; Stephen Lewellyn

(57) ABSTRACT

A vehicle hood apparatus includes a hood member, an actuating mechanism, a vehicle collision detecting sensor, vehicle speed sensor, and a control unit. The actuating mechanism couples a hood member to the vehicle and is operable to position hood member between a first position where hood member is not shielding at least a portion of a windshield of the vehicle, and a second position where hood member is shielding at least a portion of the windshield of the vehicle. The vehicle collision detecting sensor is operable to output a collision signal corresponding to a detected collision. The vehicle speed sensor is operable to output a speed signal corresponding to the speed at which the vehicle is moving. The control unit operates the actuating mechanism to move the hood member from first position to second position upon receiving a collision signal and a vehicle speed above a threshold speed.

6 Claims, 6 Drawing Sheets

VEHICLE HOOD APPARATUS

FIELD OF THE INVENTION

The present invention relates generally to vehicle occupants, and more particularly, relating to a vehicle hood apparatus arranged such that when a vehicle hits an obstacle presenting a significant threat of injury to the vehicle occupants, the vehicle hood is moved to shield the vehicle windshield against debris from braking and passing through it.

BACKGROUND OF THE INVENTION

When a vehicle strikes an obstacle at a high rate of speed there is a significant chance of debris from the obstacle or of the entire obstacle being projected into and through the windshield and causing significant injury and possible death to the vehicle occupants. This is particularly a problem in rural areas where large wild animals are forced to cross roadways to migrate within their environment. Unfortunately, when a vehicle strikes an animal in the road way the animal is more often killed. When the unfortunate animal is a large animal, such as a moose or deer, a significant amount of damage is caused to the vehicle and the animal is often projected through the windshield severely injuring or killing the vehicle occupant(s).

The prior art includes numerous devices and systems of myriad of constructions that include raising a portion of a vehicle hood and/or the deployment of air bags to dampen in the impact of a pedestrian against the vehicle and hood when struck by a moving vehicle. However, heretofore there has been little attention given to protecting the vehicle occupants from struck objects being projected through the windshield by exteriorly shielding the windshield against impact.

Accordingly, there is a need for a device that operates to shield the vehicle windshield against an object, such as a large animal, from being projected into the vehicle cabin through the windshield when the object is struck by the vehicle traveling at a speed sufficient to present a significant threat of injury to the vehicle occupants by the object.

SUMMARY OF THE INVENTION

The preferred embodiments of the present invention addresses this need by providing a vehicle hood apparatus which functions to at least partially shield a portion of the vehicle windshield against debris from being projected into the occupant cabin through the windshield.

The preferred embodiments of the present invention also provide a vehicle hood apparatus which operates to position the vehicle hood in front of the windshield to provide the shielding.

The preferred embodiments of the present invention further provide a vehicle hood apparatus including a control unit and actuator assembly for quickly and safely deploying the vehicle hood to shield the windshield upon detecting a collision with an object.

The preferred embodiments of the present invention further provide a vehicle hood apparatus that operates to position a vehicle hood to shield the vehicle windshield against an object struck by the vehicle only when a significant threat to the vehicle occupants is determined.

To achieve these and other advantages, in general, in one aspect, a vehicle hood apparatus for, when a vehicle collides with an object, shielding the windshield of the vehicle to protect vehicle cabin occupants from injury that otherwise may be caused by the object being projected through the windshield is provided. The vehicle hood apparatus includes a hood member, an actuating mechanism, a vehicle collision detecting sensor, vehicle speed sensor, and a control unit. The hood member is configured to close an upper opening of a chamber space portion formed in front of a cabin of a vehicle. The actuating mechanism couples said hood member to the vehicle and is operable to position said hood member between a first position where said hood member is not shielding at least a portion of a windshield of the vehicle, and a second position where said hood member is shielding at least a portion of the windshield of the vehicle. The vehicle collision detecting sensor is operable to output a collision signal corresponding to a detected collision with the vehicle. The vehicle speed sensor is operable to output a speed signal corresponding to the speed at which the vehicle is moving. The control unit operates said actuating mechanism to move said hood member from said first position to said second position upon receiving said collision signal indicating a collision with the vehicle, and receiving said speed signal corresponding to a vehicle speed above a threshold speed.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
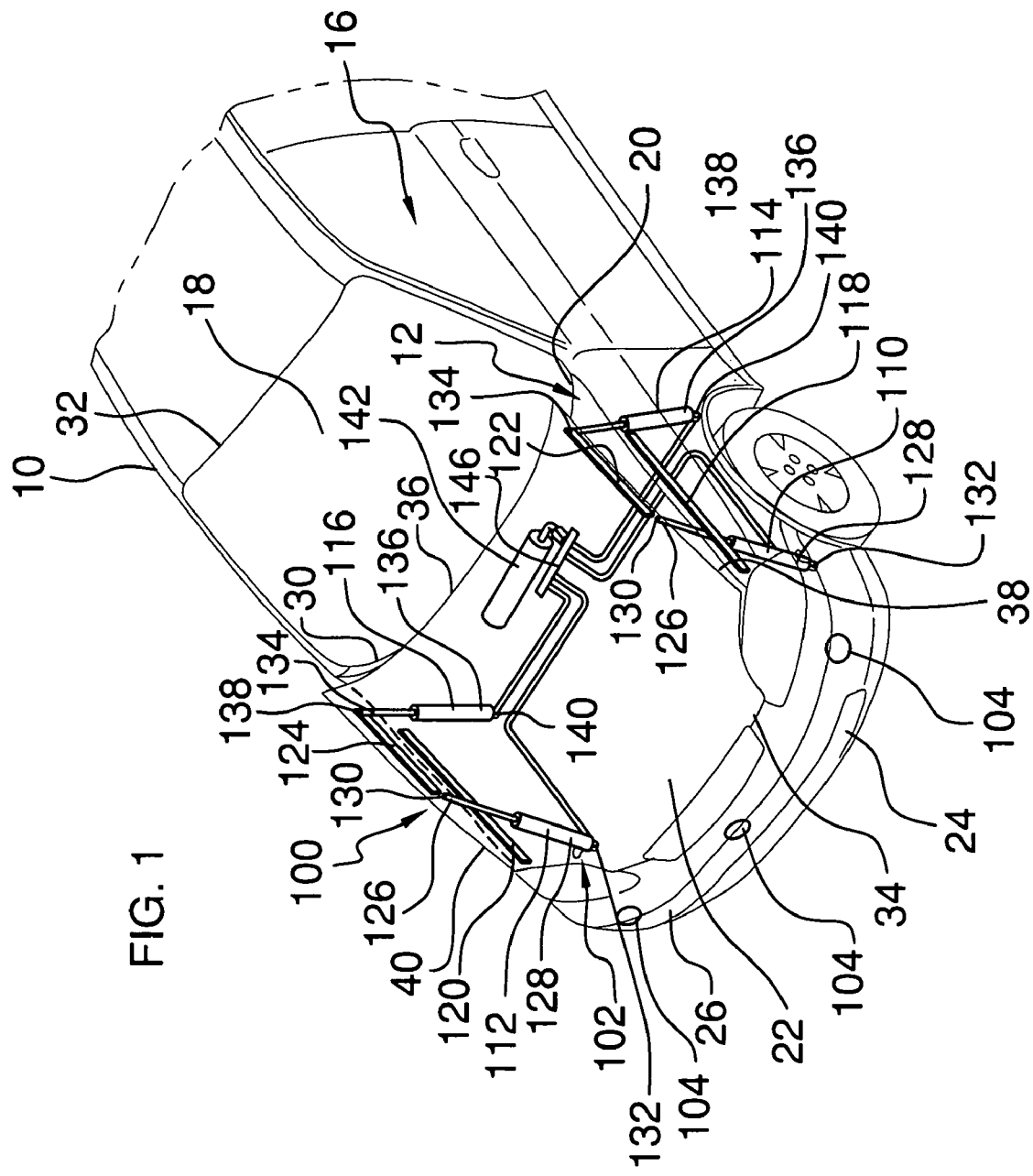
FIG. 1 is a diagrammatic perspective view of a typical passenger vehicle employing a vehicle hood apparatus in accordance with the principles of the present invention, showing the hood of the vehicle partially raised at rearward end thereof.
Figure 2:
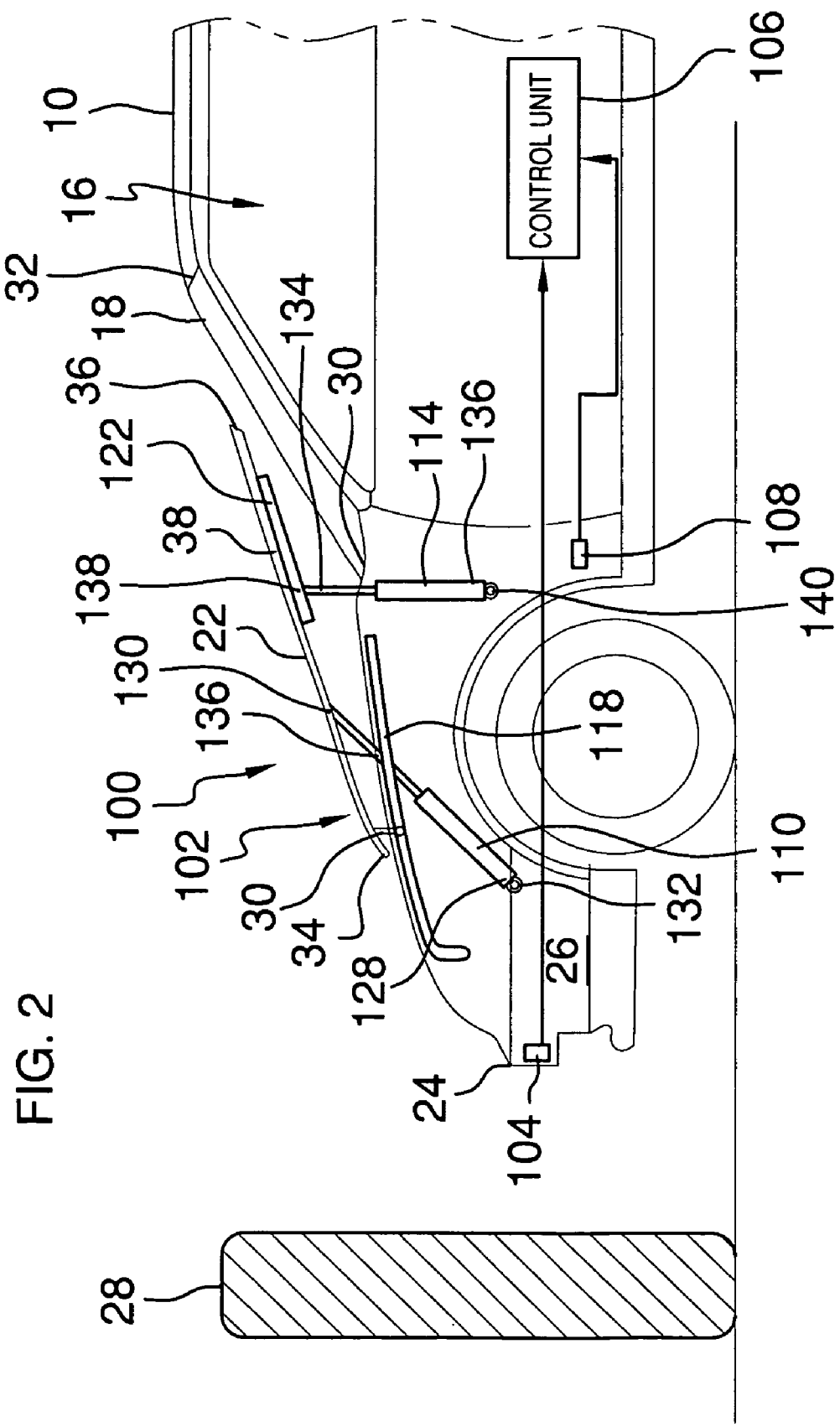
FIG. 2 is a diagrammatic left side elevation view of the passenger vehicle employing the vehicle hood apparatus, showing the hood of the vehicle moved into position covering and shielding a portion of the vehicle windshield by the vehicle hood apparatus to protect the vehicle occupants, the right side elevation is a mirror of the this view.

In FIGS. 1 and 2, there is illustrated a vehicle 10 employing a vehicle hood apparatus 100 according to the principals of the present invention. As shown in FIGS. 1 and 2, the vehicle 10 has as a chamber space, such as the engine compartment 12 in front of an occupant cabin 16 and a windshield 18. The engine compartment has an opening 20 covered by a hood 22. The windshield 18 includes a forward edge 30 and a rearward edge 32. The hood 22 includes a forward edge 34, a rearward edge 36 and opposed left and right side edges 38 and 40, respectively. In FIG. 1, the hood 22 is shown partially lifted, and in FIG. 2, the hood 22 is shown moved into position by the vehicle hood apparatus 100 to at least partially cover and shield the windshield 18.

The hood apparatus 100 comprises an actuator mechanism 102, one or more vehicle collision detecting sensors 104, a control unit 106, and a vehicle velocity sensor 108. The one or more vehicle collision detecting sensors 104 are positioned at the forward end 24 of the vehicle 10, such as for example within a bumper 26. The vehicle velocity sensor 108 can be part of the vehicle electronic control system, such as for example an electronic vehicle speed sensor typically installed in a modem transmission, or can be a separate sensor operably attached to the vehicle to determine the traveling velocity of the vehicle. Sensors 104 and 108 are well known in the related technical fields of the invention, and as such do not require a technical description herein.

When the vehicle 10 collides with a forward obstacle 28, the collision is detected by one or more of the collision sensors 104, which then output a corresponding collision signal. The actuator mechanism 102 upwardly lifts and moves the hood 22 at least partially over the windshield 18 to prevent any portion of the obstacle 28 from entering the cabin 16 through the windshield. The control unit 106 controls the actuator mechanism 102 on the basis of signals outputted from the vehicle collision detecting sensors 104 and the vehicle velocity sensor 108. The present invention may only include the vehicle collision detection sensor 104, or may include the vehicle collision detection sensor and a vehicle acceleration sensor (not shown).

The actuator mechanism 102 includes left and right forward actuators 110 and 112, left and right rearward actuators 114 and 116, left and right first guide members 118 and 120, and left and right second guide members 122 and 124.

The left and right first guide members 118 and 120 are attached to the vehicle to be positioned at opposite left and right sides of the engine compartment 12. First guides 118 and 120 are fixedly attached to the vehicle and are stationary with respect thereto. The first guides 118 and 120 extend along the vehicle 10 in a direction from the front towards the rear. A forward end 30 of the hood 22 is slidingly attached at opposite left and right sides thereof to the left and right first guide members 118 and 120, respectively. The left and right second guide members 122 and 124 are fixedly attached to opposite left and right sides of the hood 22, respectively. Guides 122 and 124 are attached to the hood 22 to be stationary with respect thereto and to move with the hood. The left and right second guide members 122 and 124 extend along the hood 22 in a direction from the rearward edge 36 of the hood towards the forward edge 34 of the hood, and generally parallel to the left and right side edges 38 and 40 respectively.

The left and right forward actuators 110 and 112 each include first and second ends 126 and 128 respectively. The first ends 126 are connected to the opposite left and right sides of the hood 22 by rotating couplings 130. The second ends 128 are connected to the opposite left and right sides of the vehicle 10, respectively, by rotating couplings 132. The left and right rearward actuators 114 and 116 each include first and second ends 134 and 136, respectively. The first ends 134 are slidably connected to the left and right second guide members 122 and 124, respectively, for movement therealong. The first ends 134 may be rotatably connected to the left and right second guide members 122 and 124, respectively, by rotating couplings 138. The second ends 136 of the left and right rearward actuators 114 and 116 are attached to opposite left and right sides of the vehicle 10, respectively, by rotating couplings 140.

The left and right forward actuators 110 and 112, and the left and right rearward actuators 114 and 116 are linear displacement actuators that operate to adjust the spaced distance between their respective first and second ends. The left and right forward actuators 110 and 112, and the left and right rearward actuators 114 and 116 can be pneumatic linear displacement actuators that are operated by a gas under pressure. Such linear displacement actuators are well known in the fields of the invention, and a such detailed technical description of the actuators is not required herein.

When the left and right forward actuators 110 and 112, and the left and right rearward actuators 114 and 116 are pneumatic linear displacement actuators, the actuator mechanism further includes a compressed gas tank 142 having contained therein a gas under pressure, a valved manifold 146 or the like fluidically connected to the compressed gas tank 142, and gas distribution lines 144 connecting the actuators 110, 112, 114, and 116 to the valved manifold. Preferably, the gas contained in the compressed gas tank 142 is an inert gas. Most preferably, the gas contained in the compressed gas tank 142 is an inert fire retarding or suppressing gas. The valved manifold 146 contains one or more electrically operated valves 152, as best seen in FIG. 3, that are controllable by the control unit 106 to effect distribution of compressed gas from the compressed gas tank 142 to the actuators 110, 112, 114 and 116.

Figure 3:
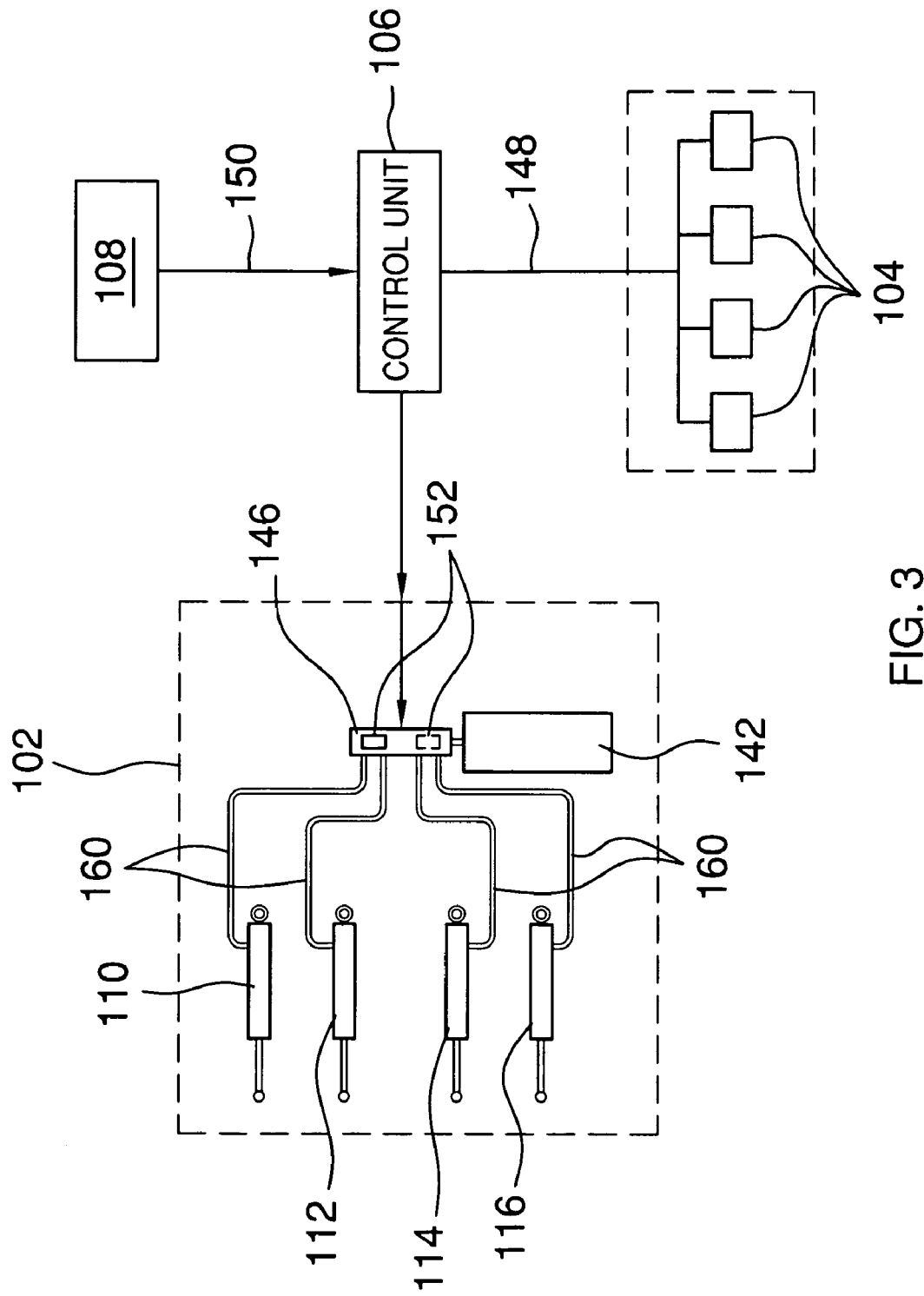
FIG. 3 is a schematic diagram showing the connection between a control unit, various sensors and actuators.

As shown in FIG. 3, and discussed above, the control unit 106 is operably connected to the one or more vehicle collision detecting sensors 104 to receive the outputted collision signal 148, is operably connected to the vehicle velocity sensor 108 to receive the outputted vehicle velocity signal 150, and is operatively connected to the actuator mechanism 102 to control the actuator mechanism to move the hood 22 into position to shield the windshield 18. As shown in FIG. 3, the actuator mechanism 102 includes pneumatic actuators 110, 112, 114 and 116, the compressed gas tank 142 and the valved manifold 146 containing valves 152. In this embodiment, the control unit 106 is operatively connected to the valves 152 to control the valves to distribute compressed gas contained in the compressed gas tank 142 to the actuators 110, 112, 114 and 116 via fluid lines 160. In other embodiments, the actuators 110, 112, 114 and 116 could be electrically operated actuators, in which case, the control unit 106 would be operatively connected to the actuators to control them.

Figure 4:
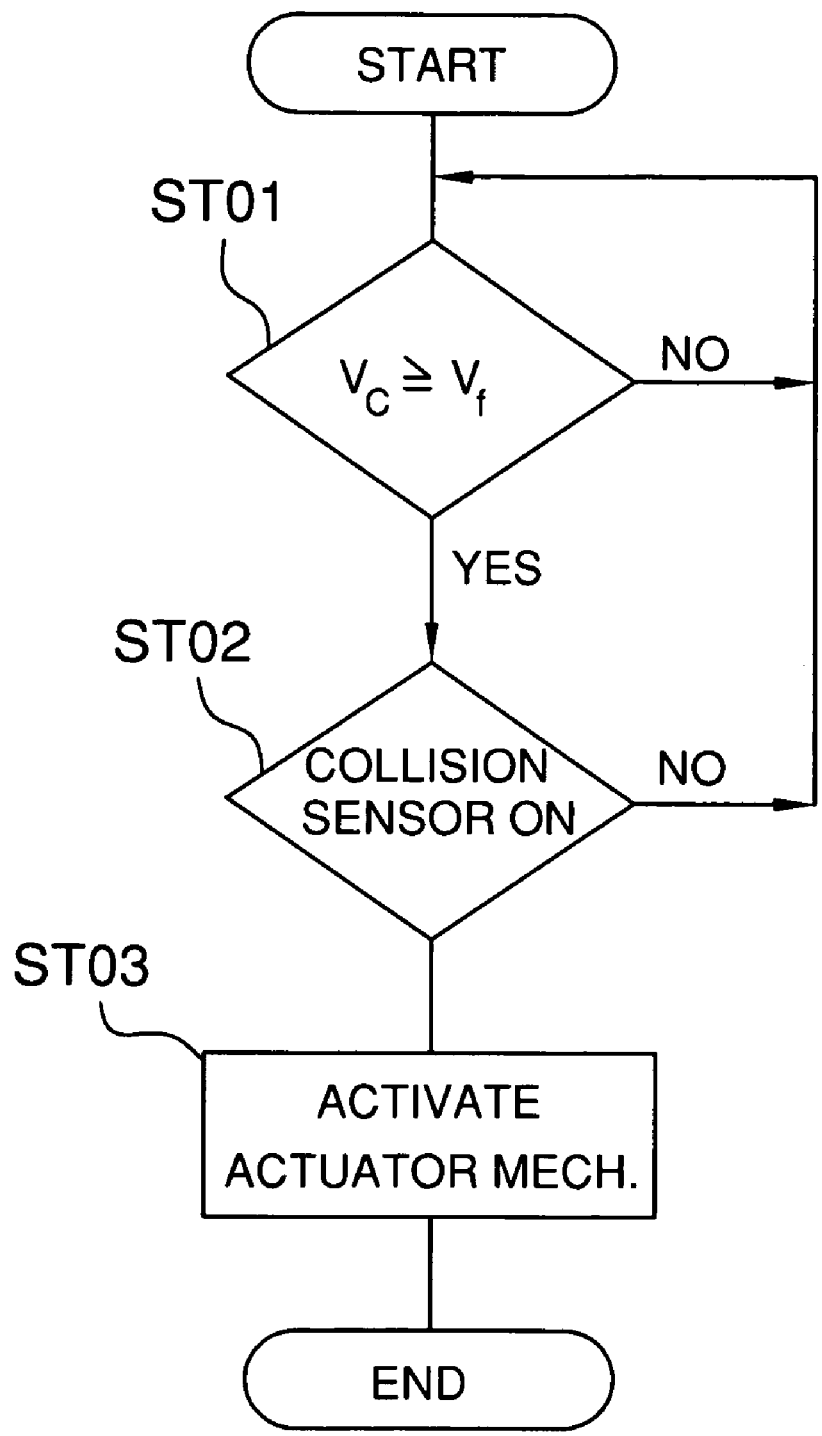
FIG. 4 is a flowchart showing the flow of control of a control unit.

With reference to FIG. 4, the operation of the control unit 106 can be described. STEP (hereinafter, simply "ST") 01: Determination is made as to whether the vehicle speed Vc detected by the vehicle velocity sensor 108 is higher than a threshold speed Vt (e.g. higher than 50 km/hr). When the detected vehicle speed Vc is higher than the threshold speed Vt, the control unit 106 proceeds to ST 02. When the detected vehicle speed Vc is lower than the threshold speed Vt, the control returns to ST 01.

ST 02: Determination is made as to whether one or more of the vehicle collision sensors 104 are ON, that is, whether one or more of the vehicle collision sensors outputting a collision signal corresponding to a detected collision. When one or more of the vehicle collision sensors 104 are ON, the control proceeds to ST: 03. When none of the one or more vehicle collision sensors 104 are ON, the control returns to ST: 01.

ST 03: Operation of the actuator mechanism 102 is effected to position the hood 22 to shield the windshield.

As can be appreciated from the above discussion, only when all determinations in ST 01 to ST 02 are Yes, it is determined that the vehicle 10 has collided with an obstacle at a sufficient speed to result in a significant threat of injury to the vehicle occupants in the vehicle cabin 16 by the obstacle or any part thereof being projected into and through the windshield.

Figure 5:
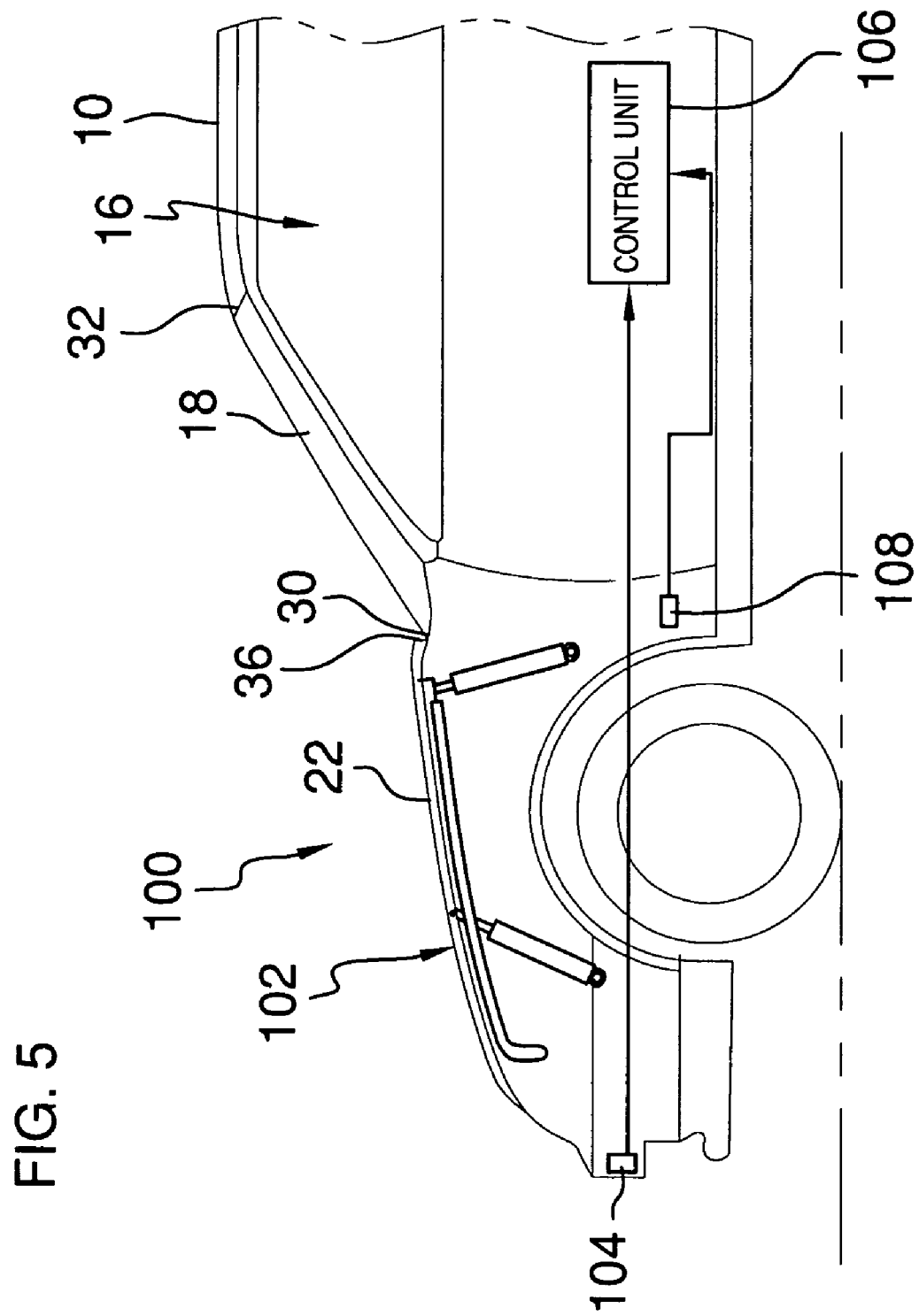
FIG. 5 is a diagrammatic view of a passenger vehicle showing the vehicle hood in a first position where the hood is in normal operating position covering the engine compartment and not covering or shielding any portion of the windshield.
Figure 6:
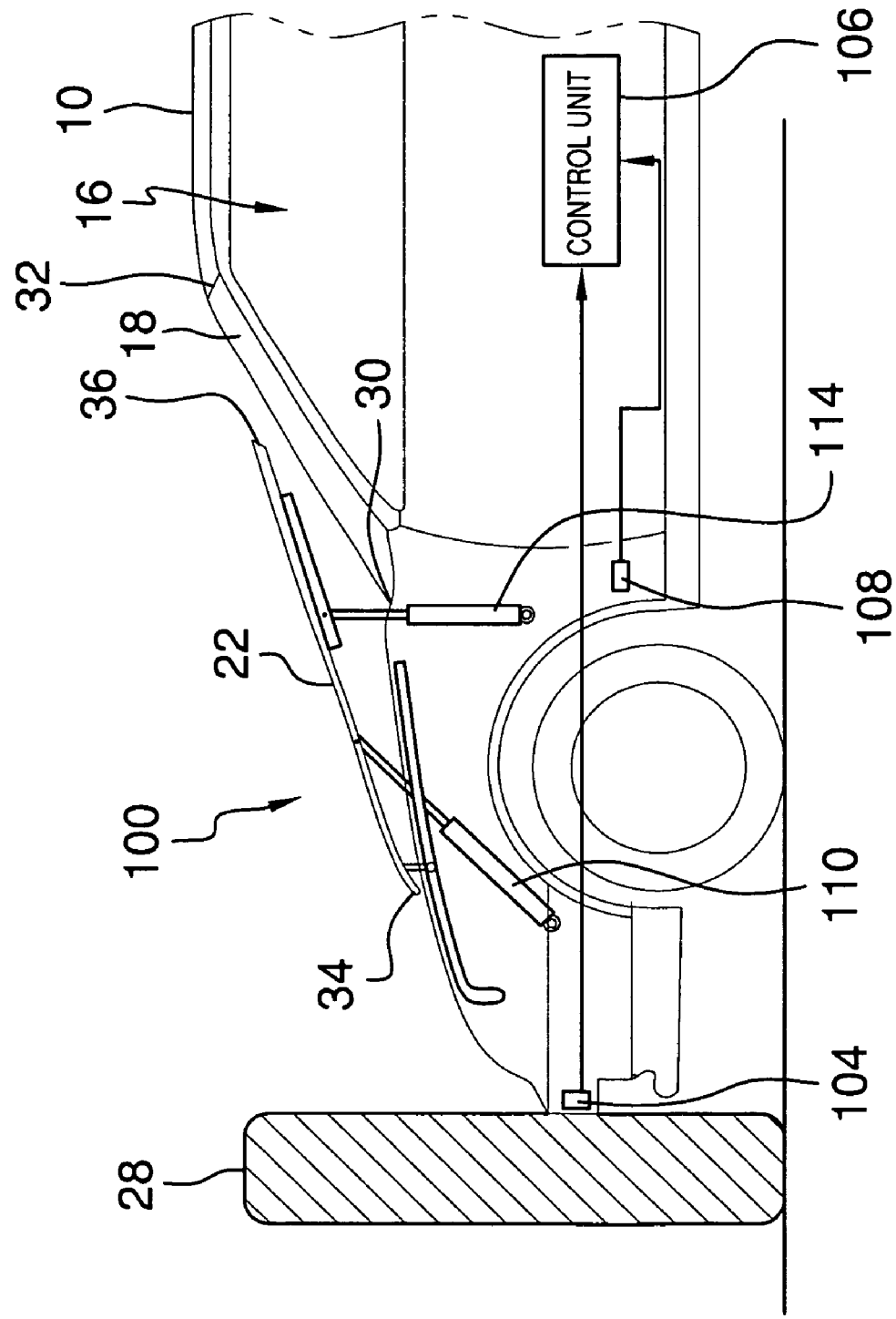
FIG. 6 is a diagrammatic view of a passenger vehicle employing the vehicle hood apparatus shortly after striking an object, with the vehicle hood in a second position covering and shielding the vehicle windshield.

With reference to FIGS. 5 and 6, the operation of the hood apparatus 100 can be discussed. In FIG. 5, the vehicle 10 is shown with the hood 22 in a first position where the hood is in normal operating position covering the engine compartment 12 and not covering or shielding any portion of the windshield. In this position, the rearward edge 36 of the hood is located forwardly and generally juxtaposed the forward edge 30 of the windshield 18. In FIG. 6, the vehicle 10 is shown shortly after striking an object 28, and with the hood 22 moved in a second position by the actuator mechanism 102 upon being operated or controlled by the control unit 106 upon receiving a vehicle collision signal corresponding to a detected collision from one or more of the vehicle collision sensors 104, and receiving a vehicle speed signal corresponding from to a vehicle speed above the threshold speed from the vehicle velocity sensor 108. Within the actuator mechanism 102 the actuators 110, 112, 114 and 116 are operated to extend, and thus positioning the hood 22 in the second position, as shown.

In this second position, the rearward edge 36 of the hood 22 is located above the windshield 18 and between the forward and rearward edges 30 and 32 thereof. Accordingly, the portion of the hood 22 extending between the rearward edge 36 thereof and the forward edge 30 of the windshield 22 is positioned to cover the windshield and shield a coextensive portion thereof. Further, in this position, the rearward edge 36 of the hood 22 is elevated at a height higher than the forward edge 34 such that the hood is angled in an upwardly direction from the forward edge 34 to the rearward edge 36. The inclined positioning of the hood 22 further aids in shielding the windshield 22 from the object 28 by generally directing the object in an upward direction away from the windshield.

A number of embodiments of the present invention have been described. Nevertheless, it will be understood that various modifications may be made without departing from the spirit and scope of the invention. Accordingly, other embodiments are within the scope of the following claims.

What is claimed is:

1. A vehicle hood apparatus for shielding a windshield of a vehicle during a collision with an object to protect vehicle cabin occupants from injury that otherwise may be caused by the object being projected through the windshield, the vehicle hood apparatus comprising:
   a hood member which is configured to close an upper opening of a chamber space portion formed in front of a cabin of a vehicle;
   an actuating mechanism comprising left and right first guide members slidably connecting opposite sides of said hood member to the vehicle, left and right second guide members fixedly connected to opposite sides of said hood member, left and right rearward actuators each having a first end that is slidably connected to said left and right second guide members respectively, and left and right forward actuators connected to opposite sides of said hood member; wherein said actuating mechanism is coupled to said hood member of the vehicle and operable to position said hood member between a first position where said hood member is not shielding at least a portion of a windshield of the vehicle, and a second position where said hood member is shielding at least a portion of the windshield of the vehicle;
   a vehicle collision detecting sensor operable to output a collision signal corresponding to a detected collision with the vehicle;
   a vehicle speed sensor operable to output a speed signal corresponding to the speed at which the vehicle is moving; and
   a control unit for operating said actuating mechanism to move said hood member from said first position to said second position upon receiving said collision signal indicating a collision with the vehicle, and receiving said speed signal corresponding to a vehicle speed above a threshold speed.

2. The vehicle hood apparatus of claim 1, wherein each of said left and right forward actuators include first and second ends, and wherein said left and right forward actuators are connected to said opposite sides of said hood member by rotatable couplings between said first ends of said left and right forward actuators respectively, and further wherein said left and right forward actuators are connected to opposite sides of the vehicle by rotatable couplings between said second ends of said left and right forward actuators respectively; and
   further wherein said first ends of said left and right rearward actuators are connected to said opposite sides of said hood member by rotatable couplings, and each of said left and right rearward actuators further including a second end connected to opposite sides of the vehicle respectively.

3. The vehicle hood apparatus of claim 1, further comprising:
   a gas cylinder containing a gas under pressure;
   wherein said left and right forward actuators and said left and right rearward actuators are gas operable and are fluidically connected to said gas cylinder to receive said gas contained therein to effect operation thereof.

4. A vehicle hood apparatus for shielding a windshield of a vehicle during a collision with an object to protect vehicle cabin occupants from injury that otherwise may be caused by the object being projected through the windshield, the vehicle hood apparatus comprising:
   a hood member configured to close an upper opening of a chamber space portion formed in front of a cabin of a vehicle;

a vehicle collision detecting sensor operable to output a collision signal corresponding to a detected collision with the vehicle;

a vehicle speed sensor operable to output a speed signal corresponding to the speed at which the vehicle is moving;

an actuating mechanism coupling said hood member to the vehicle and operable to position said hood member from a forward, lowered first position to a rearward, raised second position, wherein when said hood member is in said forward, lowered first position, the upper opening of the chamber space is closed by said hood member, and wherein when said hood member is in said rearward, raised second position, said hood member is located rearwardly of said first position and above and at least partially overlapping the windshield, thereby shielding at least a portion of the windshield of the vehicle, said actuating mechanism comprising;

left and right first guide members slidably connecting opposite sides of said hood member to the vehicle;

left and right second guide members fixedly connected to opposite sides of said hood member;

left and right rearward actuators each having a first end that is slidably connected to said left and right second guide members respectively;

left and right forward actuators connected to opposite sides of said hood member; and a control unit for operating said actuating mechanism to move said hood member from said first position to said second position upon receiving said collision signal indicating a collision with the vehicle, and receiving said speed signal corresponding to a vehicle speed above a threshold speed.

5. The vehicle hood apparatus of claim 4, wherein each of said left and right forward actuators include first and second ends, and wherein said left and right forward actuators are connected to said opposite sides of said hood member by rotatable couplings between said first ends of said left and right forward actuators respectively, and further wherein said left and right forward actuators are connected to opposite sides of the vehicle by rotatable couplings between said second ends of said left and right forward actuators respectively; and further wherein said first ends of said left and right rearward actuators are connected to said opposite sides of said hood member by rotatable couplings, and each of said left and right rearward actuators further including a second end connected to opposite sides of the vehicle respectively.

6. The vehicle hood apparatus of claim 4, further comprising:

a gas cylinder containing a gas under pressure;

wherein said left and right forward actuators and said left and right rearward actuators are gas operable and are fluidically connected to said gas cylinder to receive said gas contained therein to effect operation thereof.

* * * * *